(12) United States Patent
Nakamura et al.

(10) Patent No.: US 11,593,574 B2
(45) Date of Patent: Feb. 28, 2023

(54) PRINTER PERFORMING QUALITY DETERMINATION PROCESS TO DETERMINE QUALITIES OF PRINTED BARCODES

(71) Applicant: BROTHER KOGYO KABUSHIKI KAISHA, Nagoya (JP)

(72) Inventors: Mitsuru Nakamura, Nagoya (JP); Hideyuki Kusunoki, Nakatsugawa (JP); Yuji Sato, Nagoya (JP); Keita Koyama, Nagoya (JP); Katsunori Sakai, Toyokawa (JP); Akidi Yoshida, Nagoya (JP); Ayaka Oba, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 62 days.

(21) Appl. No.: 17/212,800

(22) Filed: Mar. 25, 2021

(65) Prior Publication Data

US 2021/0303804 A1  Sep. 30, 2021

(30) Foreign Application Priority Data

Mar. 31, 2020 (JP) .............................. JP2020-064856

(51) Int. Cl.
*G06K 5/02* (2006.01)
*H04N 1/00* (2006.01)
(Continued)

(52) U.S. Cl.
CPC .......... *G06K 5/02* (2013.01); *G06K 19/06028* (2013.01); *G06T 7/001* (2013.01);
(Continued)

(58) Field of Classification Search
CPC ................ G06K 5/02; G06K 19/06028; G06T 2207/30144; H04N 1/00029
(Continued)

(56) References Cited

U.S. PATENT DOCUMENTS

| 5,871,288 A | * | 2/1999 | Ryan, Jr. .................. G06K 5/00 400/74 |
| 2002/0030708 A1 | * | 3/2002 | Yoshida ................. B41J 19/202 347/19 |

(Continued)

FOREIGN PATENT DOCUMENTS

| JP | 2001-001616 A | 1/2001 |
| JP | 2006-168048 A | 6/2006 |
| JP | 2012-183698 A | 9/2012 |

*Primary Examiner* — Paultep Savusdiphol
(74) *Attorney, Agent, or Firm* — Baker Botts L.L.P.

(57) ABSTRACT

In a printer, a controller controls a printing portion to execute a sample print to print on a sheet a plurality of barcodes. Each of the plurality of barcodes is represented by a received barcode data and printed in a different printing condition. The controller controls a reading portion to read the plurality of barcodes printed on the sheet in the sample print process to obtain a plurality of sets of scan data corresponding to respective ones of the plurality of barcodes. The controller performs a quality determination process to determine qualities of the plurality of printed barcodes based on the respective ones of the plurality of sets of scan data, and a printing condition setting process to set a printing condition based on the qualities determined in the quality determination process. The set printing condition is to be used to print a barcode by the printing portion.

17 Claims, 9 Drawing Sheets

(51) Int. Cl.
*G06T 7/00* (2017.01)
*G06K 19/06* (2006.01)

(52) U.S. Cl.
CPC ..... *H04N 1/00029* (2013.01); *H04N 1/00588* (2013.01); *G06T 2207/30144* (2013.01)

(58) Field of Classification Search
USPC .................................. 235/437, 438, 462.13
See application file for complete search history.

(56) References Cited

U.S. PATENT DOCUMENTS

| | | | | |
|---|---|---|---|---|
| 2005/0270325 A1* | 12/2005 | Cavill | ................... | B41J 29/393 |
| | | | | 347/19 |
| 2009/0059311 A1* | 3/2009 | Nelson | ............... | H04N 1/00023 |
| | | | | 358/406 |
| 2009/0237685 A1* | 9/2009 | Nishihara | .......... | G03G 15/5062 |
| | | | | 358/1.9 |
| 2015/0116734 A1* | 4/2015 | Howard | ................ | B41J 2/2146 |
| | | | | 358/1.4 |
| 2015/0116735 A1* | 4/2015 | Howard | ............... | G06K 9/6201 |
| | | | | 358/1.4 |

* cited by examiner

PRINTER PERFORMING QUALITY DETERMINATION PROCESS TO DETERMINE QUALITIES OF PRINTED BARCODES

CROSS REFERENCE TO RELATED APPLICATION

This application claims priority from Japanese Patent Application No. 2020-064856 dated Mar. 31, 2020. The entire content of the priority application is incorporated herein by reference.

TECHNICAL FIELD

The present disclosure relates to a printer.

BACKGROUND

A label printer is known in the art as one type of printing device. The label printer prints images on continuous label paper that has been wound into a roll shape.

The images that these label printers print on the label paper may include barcodes. Among such label printers, one proposed device has a test printing function for printing barcodes while varying each bar and each space between the bars by one dot at a time. The user scans the barcode printed according to the test printing function with a barcode reader. The user finds widths for bars and spaces that are optimal for reading with the barcode reader, and the device records the optimal bar and space widths. Thereafter the device uses the recorded widths for printing barcodes.

SUMMARY

However, in order to record these optimal printing conditions, the user is required to perform scanning operations with a barcode reader for each test-printed barcode. This is a time-consuming process for the user.

In view of the foregoing, it is an object of the present disclosure to provide a printer capable of setting printing conditions for printing barcodes while reducing the user's time and effort required for setting such printing conditions.

In order to attain the above and other objects, the disclosure provides a printer. The printer includes: a receiving portion, a printing portion, a reading portion, and a controller. The receiving portion is configured to receive barcode date representing a barcode. The printing portion is configured to print an image on a sheet. The reading portion is configured to read the image printed on the sheet. The controller is configured to perform: a sample print process to control the printing portion to execute a sample print to print on a sheet a plurality of barcodes, each of the plurality of barcodes being represented by the received barcode data and printed in a different printing condition; a first reading process to control the reading portion to read the plurality of barcodes printed on the sheet in the sample print process to obtain a plurality of sets of scan data corresponding to respective ones of the plurality of barcodes; a quality determination process to determine qualities of the plurality of printed barcodes based on the respective ones of the plurality of sets of scan data; and a printing condition setting process to set a printing condition based on the qualities determined in the quality determination process, the set printing condition being to be used to print a barcode by the printing portion.

According to another aspect, the disclosure provides a printer. The printer includes: a receiving portion, a printing portion, a reading portion, and a controller. The receiving portion is configured to receive barcode date representing a barcode. The printing portion is configured to print an image on a sheet. The reading portion is configured to read the image printed on the sheet. The controller is configured to perform: a sample print process to control the printing portion to execute a sample print to print on a sheet a plurality of barcodes, each of the plurality of barcodes being represented by the received barcode data and printed in a different printing condition; a first reading process to control the reading portion to read the plurality of barcodes printed on the sheet in the sample print process to obtain a plurality of sets of scan data corresponding to respective ones of the plurality of barcodes; a quality determination process to determine qualities of the plurality of printed barcodes based on the respective ones of the plurality of sets of scan data; and a notification process to notify the qualities determined in the quality determination process.

BRIEF DESCRIPTION OF THE DRAWINGS

The particular features and advantages of the disclosure as well as other objects will become apparent from the following description taken in connection with the accompanying drawings, in which.

DETAILED DESCRIPTION

An embodiment of the present disclosure will be described while referring to attached drawings.

Label Printer

Figure 1:
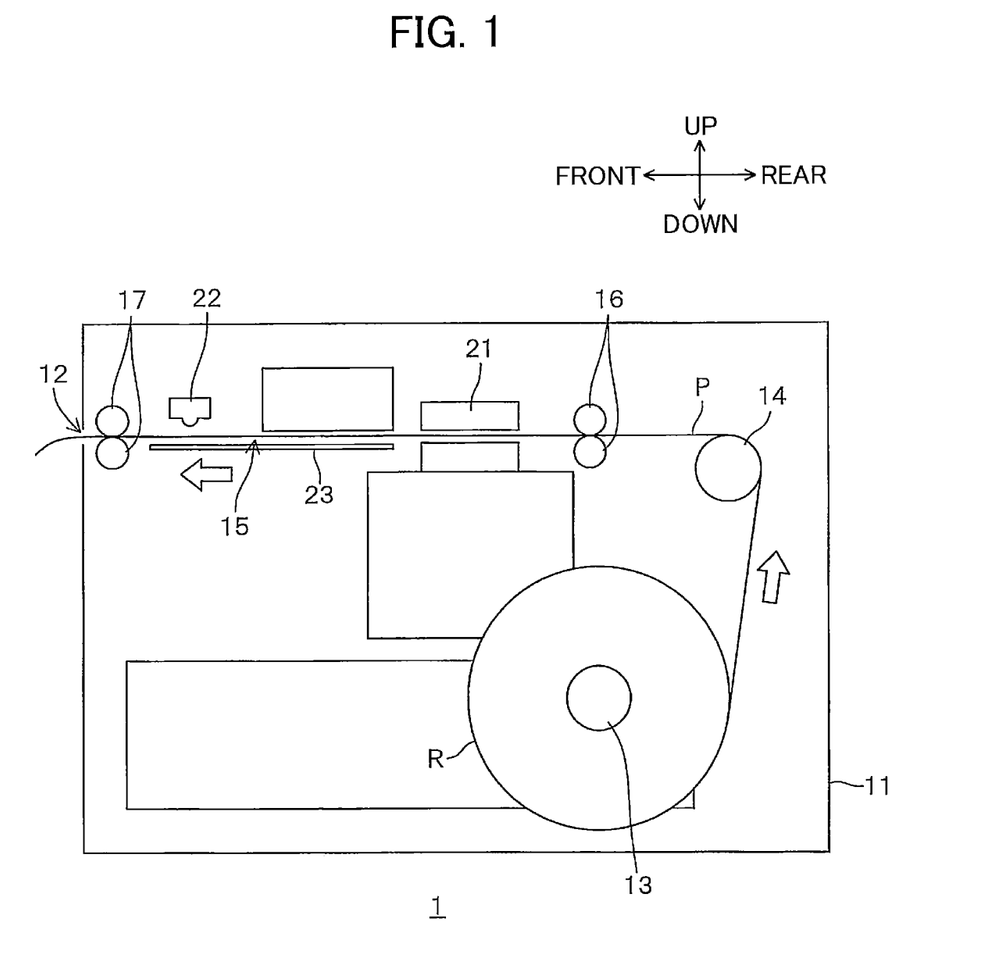
FIG. 1 is a cross section illustrating configurations of a label printer according to an embodiment.

FIG. 1 shows a label printer 1. The label printer 1 has a casing 11 that forms the outer shell of the label printer 1. A tape outlet 12 is formed in a side surface of the casing 11. The label printer 1 is a device that prints images on a continuous strip of label paper P (an example of a paper) and discharges the printed label paper P from the casing 11 through the tape outlet 12.

In the following description, the front, rear, left, and right sides of the label printer 1 are defined based on the perspective of a user facing the front side of the label printer 1. The front side of the label printer 1 is defined as the side in which the tape outlet 12 is formed. The top and bottom of the label printer 1 are defined based on the state of the label printer 1 when the label printer 1 is resting on a level surface. The cross-sectional view shown in FIG. 1 is a view from the right side of a cross section taken along a plane extending through the label printer 1 in the front-rear direction.

The label paper P may be a die-cut paper configured of labels affixed to a continuous base paper in a juxtaposition in the longitudinal direction of the base paper. Alternatively, the label paper P may be a non-fixed-length paper (a continuous paper) configured of continuous normal paper having a background image preprinted on the printing surface thereof, the background image including printing areas arranged at regular intervals. Alternatively, the label paper P may be a non-fixed-length paper configured of a normal paper or thermal paper having no background image printed thereon. The die-cut paper has an adhesive surface for each label and a printing surface on the side opposite the adhesive surface that constitutes the printing area.

The tape outlet 12 is a rectangular-shaped opening that is elongated in the left-right direction. The tape outlet 12 provides communication between the interior and exterior of the casing 11.

A roller holder 13 is provided in the casing 11 for holding the label paper P in the shape of a roll R. To form the roll R, the label paper P is wound about a core so that the printing surface faces outward. The roller holder 13 has a general columnar shape and the core of the roll R is fitted around the roller holder 13, enabling the roll R to be retained on the roller holder 13.

A direction-changing roller 14 is provided in the casing 11 to the upper-rear of the roller holder 13. A conveying path 15 along which the label paper P is conveyed is formed on the front side of the direction-changing roller 14. The conveying path 15 extends forward from the top of the direction-changing roller 14. The front end of the conveying path 15 communicates with the tape outlet 12. The label paper P is drawn off the roll R toward the rear side of the direction-changing roller 14 and wraps partially around the circumferential surface of the direction-changing roller 14 before continuing in the forward direction. The label paper P is conveyed forward through the conveying path 15 from the direction-changing roller 14 toward the tape outlet 12.

Pairs of conveying rollers 16 and 17 are provided along the conveying path 15 for conveying the label paper P. The conveying rollers 16 are disposed on the front side of the direction-changing roller 14 with a space formed therebetween. The conveying rollers 17 are disposed on the rear side of the tape outlet 12 and the front side of the conveying rollers 16 and are spaced apart from the conveying rollers 16. A motor M (see FIG. 2) is driven to rotate forward to transmit a drive force to the conveying rollers 16 and 17. With the label paper P interposed between the pairs of conveying rollers 16 and conveying rollers 17, the conveying rollers 16 and 17, which are rotated by the drive force, convey the label paper P along the conveying path 15 in a conveying direction (or feed direction) toward the tape outlet 12. Further, in a case that the motor M is driven in a reverse direction, the drive force of the motor M is transmitted to the roller holder 13, causing the core of the roll R to be rotated in the direction opposite the rotating direction when the label paper P is being conveyed in the conveying direction, thereby conveying the label paper P in a take-up direction opposite the conveying direction (hereinafter also referred to as "rewinding the label paper P"). The take-up direction may be referred to as a backward direction. When the label paper P is conveyed in the take-up direction, the conveying rollers 16 and 17 are in an idle rotating state.

A print head 21 (an example of a printing portion) and a contact image sensor (CIS) unit 22 (an example of a reading portion) are arranged in this order in the conveying direction between the conveying rollers 16 and the conveying rollers 17.

The print head 21 is arranged to face the conveying path 15 from above. For example, the print head 21 employs an inkjet recording system to print images on the printing surface of the label paper P conveyed along the conveying path 15. The position in the conveying path 15 vertically opposing the print head 21 is the printing position of the print head 21, i.e., the position at which the print head 21 can print. Thus, the print head 21 prints a partial image on the printing surface of the label paper P located at the printing position.

The CIS unit 22 is disposed downstream of the print head 21 in the conveying direction and faces the conveying path 15 from above. The CIS unit 22 reads the printing surface of the label paper P conveyed along the conveying path 15. While not shown in the drawings, the CIS unit 22 has a built-in light source, a rod lens array, and a linear image sensor. The light source irradiates light in the form of a line onto the printing surface of the label paper P. The light is reflected off the printing surface, passes through the rod lens array, and is incident on the linear image sensor. Through this process, the CIS unit 22 reads one line worth of an original (a line extending in a main scanning direction) at the reading position of the CIS unit 22. The linear image sensor is configured of a plurality of imaging elements (image sensors) that are arranged in a single line in the main scanning direction. The image data read by each imaging element constitutes data for one pixel (a pixel value). In the embodiment, the main scanning direction is a direction orthogonal to the feeding direction of the label paper P A platen 23 is provided between the conveying rollers 16 and the conveying rollers 17. The platen 23 is arranged on the opposite side of the conveying path 15 from the print head 21 and CIS unit 22, and opposes the print head 21 and CIS unit 22 from below. The top surface of the platen 23 (i.e., the surface that opposes the print head 21 and CIS unit 22) is formed flat for supporting the bottom of the label paper P. The top surface of the platen 23 is black in color. The width of a line read by the CIS unit 22 in the main scanning direction is greater than the width of the label paper P in the main scanning direction.

Principal Parts of the Electrical Structure

Figure 2:
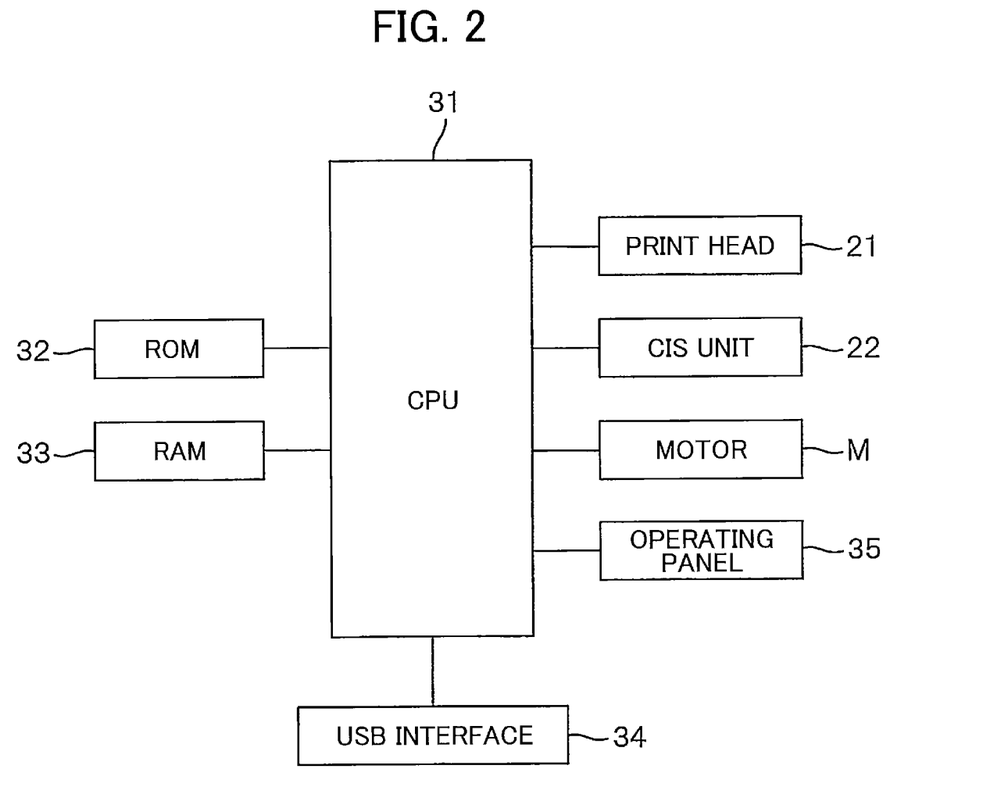
FIG. 2 is a block diagram illustrating electrical configurations of the label printer.

As shown in FIG. 2, the label printer 1 is provided with a central processing unit (CPU) 31, a read-only memory (ROM) 32, and a random-access memory (RAM) 33.

By executing programs for various processes, the CPU 31 controls the print head 21 and the CIS unit 22 and controls the motor M (an example of a drive portion) to drive the conveying rollers 16 and 17.

The ROM 32 is rewritable nonvolatile memory such as flash memory. The ROM 32 stores programs executed by the CPU 31, various data, and the like.

The RAM 33 is volatile memory such as dynamic random-access memory (DRAM). The RAM 33 is used as a work area in which the CPU 31 executes programs. The RAM 33 configures a step number counter. The step number counter increments (adds 1 to) a step number each time the motor M is driven one step. By controlling the drive of the motor M based on the number of steps counted by the step number counter, the CPU 31 can control the position of the label paper P.

The label printer 1 is also provided with a USB interface 34 (an example of a reception portion). The USB interface 34 is provided for performing data communications with a USB Device such as a USB flash drive. The USB interface 34 is provided with a USB controller that controls the USB connection between a USB connector and the USB device connected via a USB cable.

The label printer 1 is also provided with an operating panel 35 (an example of an input interface). The operating panel 35 includes an operation interface that a user operates to perform various settings, and a display for displaying information. The operation interface and the display may be provided separately or may be configured as a touchscreen. The touchscreen is configured of a display, such as a liquid crystal display, that is overlain with an operation interface configured of resistive or capacitive transparent film switches or the like.

Printing Process

Figure 3:
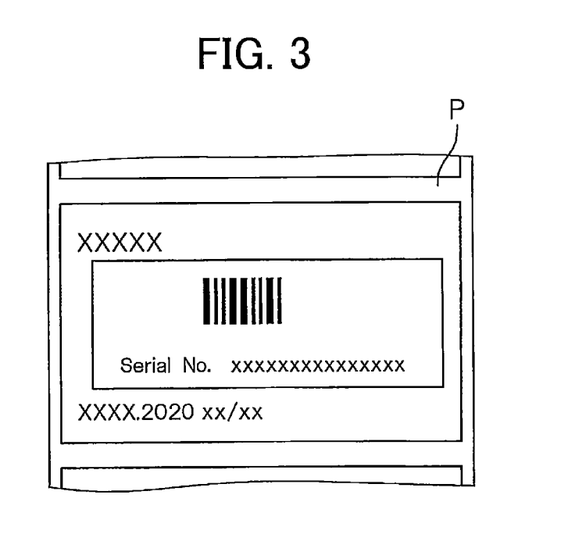
FIG. 3 is an explanatory diagram illustrating an example of an image printed on a label paper by the label printer.

A product label such as that shown in FIG. 3 can be created on the label printer 1 by printing an image on a label having a preprinted background image. To execute a printing operation on the label printer 1, a USB flash drive (USB memory) storing print data is connected to the USB interface 34 (USB connector), for example, and the user presses a print start button provided on the operating panel 35. The print data includes information on the positions and types of characters, the positions of graphics, and the like in the image being printed. This information is described in a page description language.

Figure 4A:
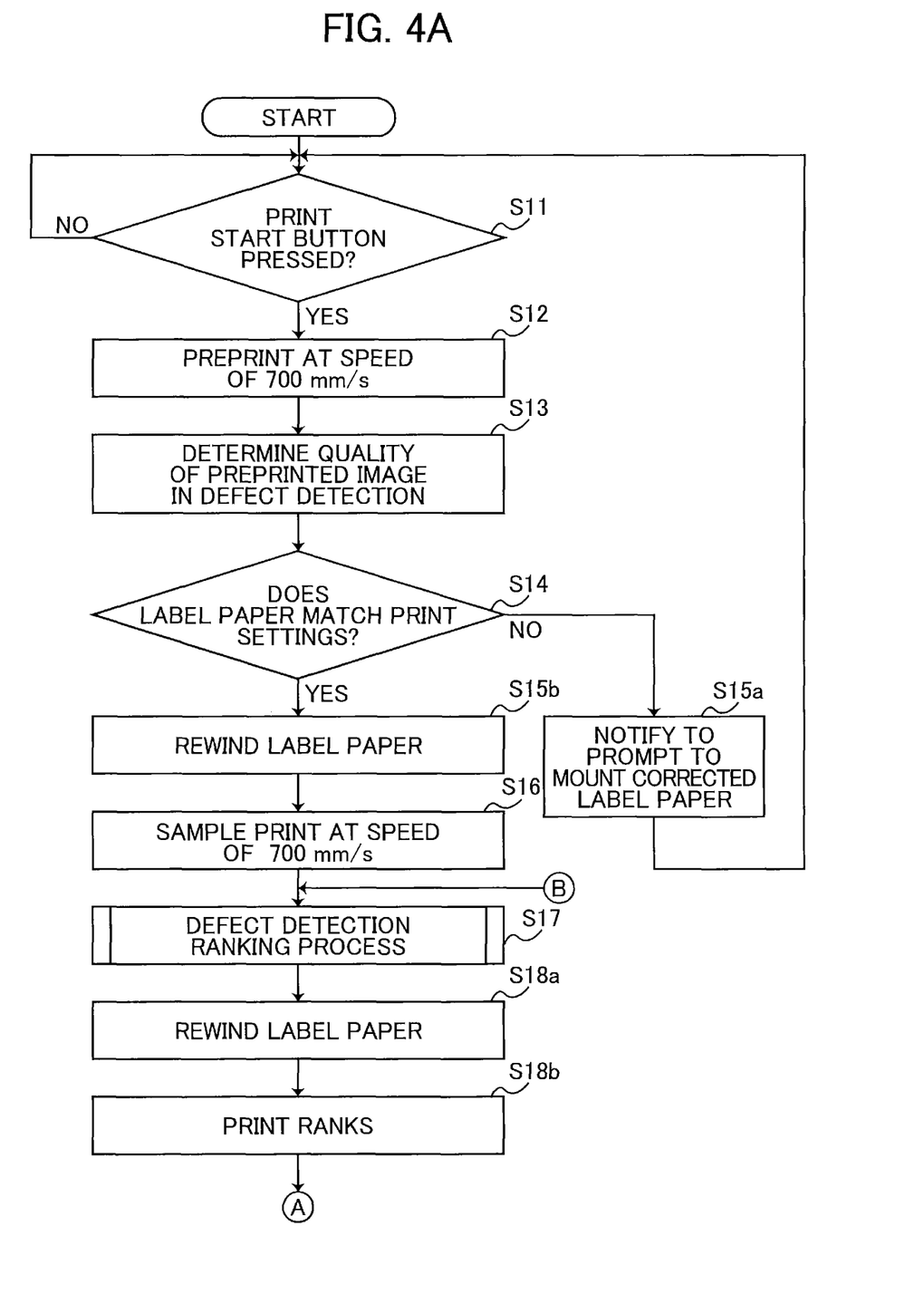
FIG. 4A is a flowchart illustrating a first part of a printing process.
Figure 4B:
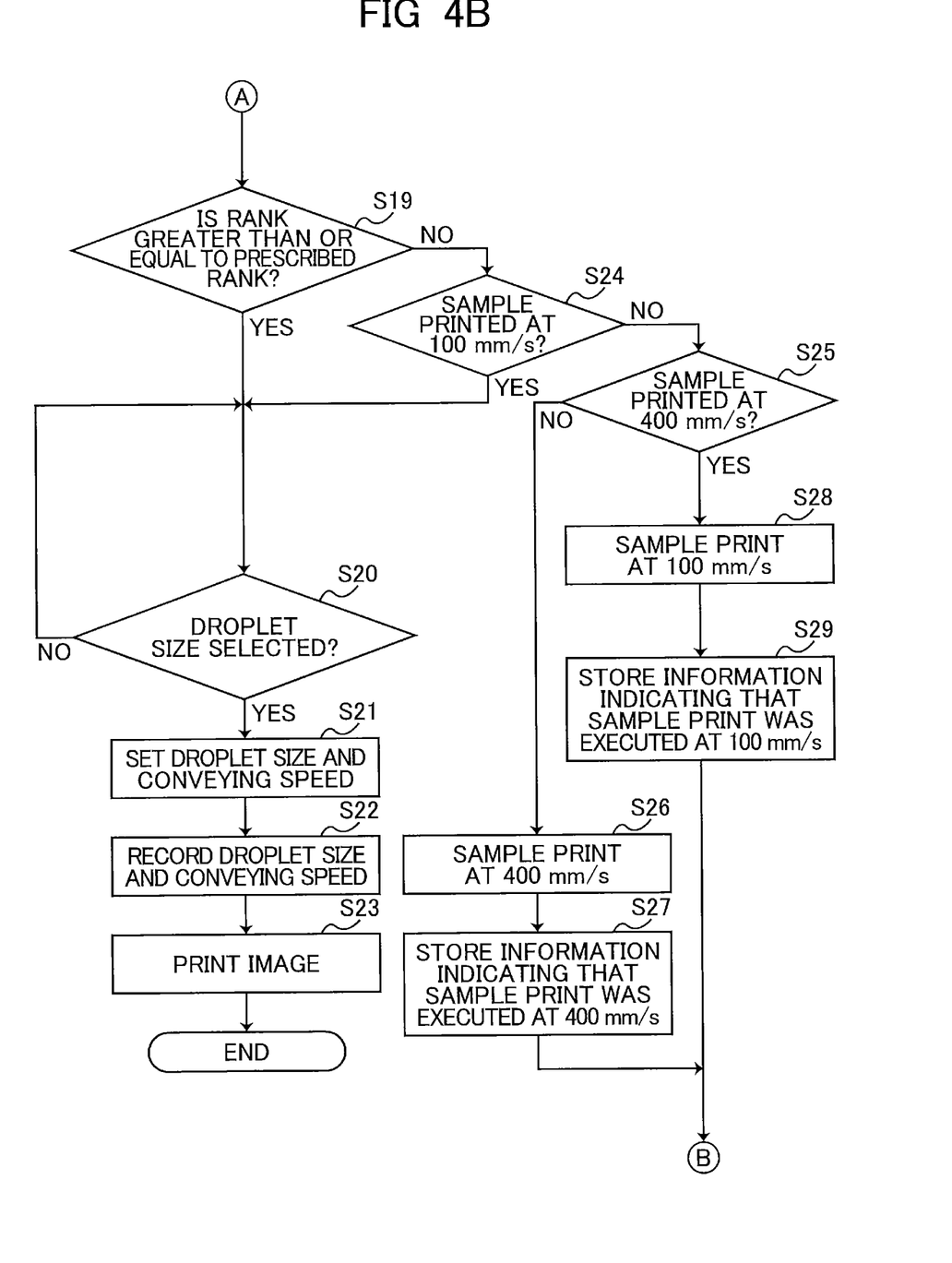
FIG. 4B is a flowchart illustrating a second part of the printing process.

The CPU 31 of the label printer 1 executes the printing process shown in FIGS. 4A and 4B.

In S11 of the printing process, the CPU 31 determines whether the print start button has been pressed and repeats the determination while the button has not been pressed (S11: NO). In a case that the user connects The USB flash drive to the USB interface 34 and presses the print start button (S11: YES), the CPU 31 acquires print data from the USB flash drive via the USB interface 34. Here, print settings have been recorded on the rewritable ROM 32 in association with user information. At this time, the CPU 31 reads the print settings from the ROM 32 that correspond to the current user.

Figure 5:
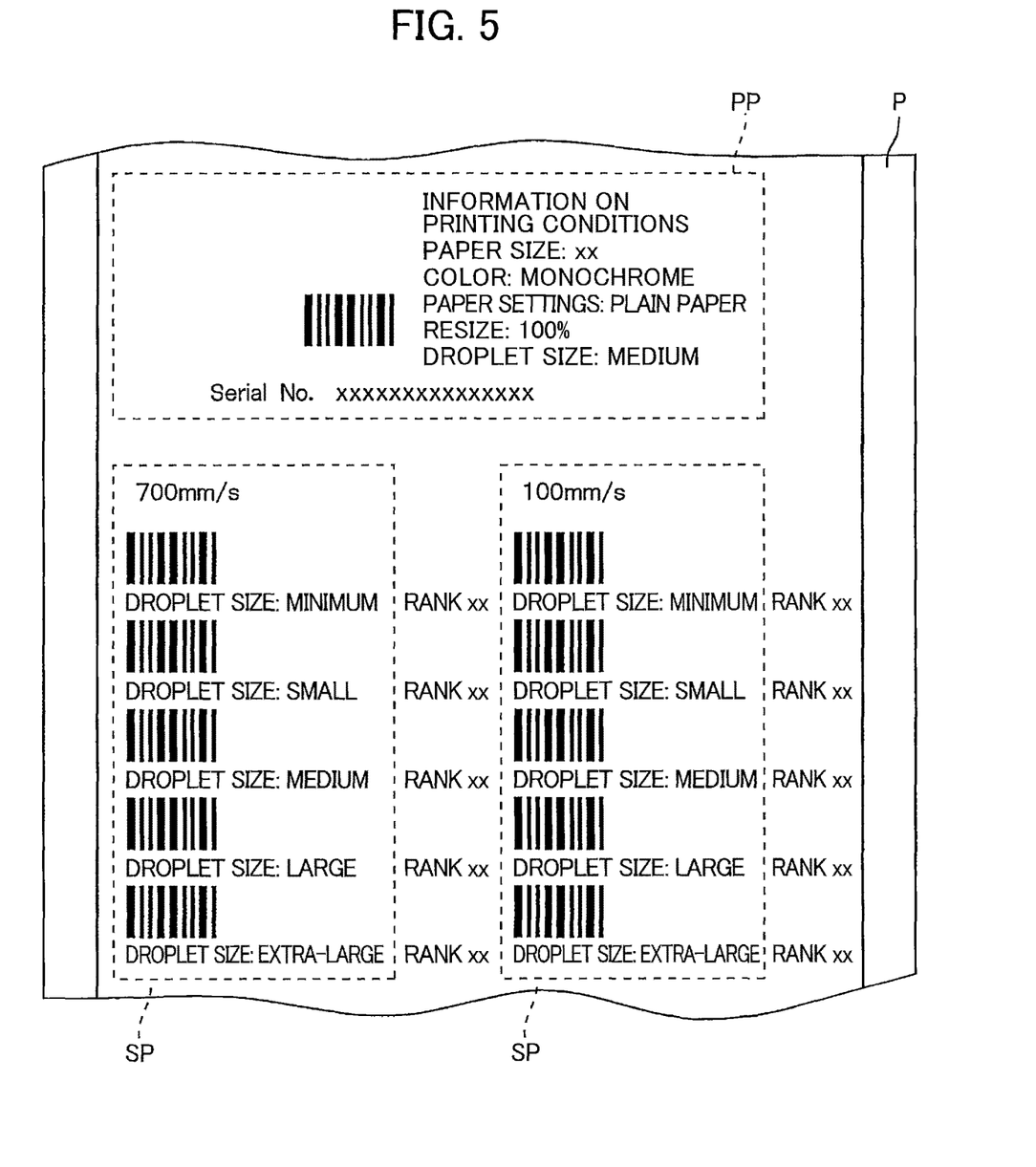
FIG. 5 is an explanatory diagram illustrating an example of a preprinted image and sample print images printed on the label paper.

In S12 the CPU 31 controls the motor M so that the label paper P is conveyed in the conveying direction at a speed of 700 mm/s and executes a preprint. Specifically, the CPU 31 controls the print head 21 according to the print settings read from the ROM 32 to print the image (hereinafter called the "target image") included in the print data, and a character string representing the content of the print settings on the label paper P. An upper part of FIG. 5 shows an example of a preprinted image PP obtained through this preprinting process. As described above, the preprinted image PP includes the target image and a character string representing the content of print settings printed on the label paper P.

Note that the following description assumes that the target image includes a barcode symbol.

Next, the CPU 31 controls the CIS unit 22 to read the preprinted image PP. This operation is an example of the second reading process. In S13 the CPU 31 determines based on data for the preprinted image PP read by the CIS unit 22 whether the preprinted image PP satisfies a given quality (defect detection). In a case that the preprinted image PP satisfies the given quality, the CPU 31 determines that the label paper P on which the preprinted image PP has been printed matches the print settings, and determines that a label paper P (a roll R) matching the print settings is set on the roller holder 13 (S14: YES). However, in a case that the preprinted image PP does not satisfy the given quality, the CPU 31 determines that the label paper P on which the preprinted image PP has been printed does not match the print settings and determines that a label paper P (a roll R) differing from that in the print settings is set on the roller holder 13 (S14: NO).

In a case that the CPU 31 determines that a label paper P differing from the print settings is set on the roller holder 13 (S14: YES), in S15a the CPU 31 displays a notification on the operating panel 35 prompting the user to mount the correct label paper. Subsequently, the CPU 31 returns to S11 and waits until the print start button is pressed again.

When the CPU 31 determines that label paper P matching the print settings is set on the roller holder (S14: NO), in S15b the CPU 31 controls the motor M to rewind the label paper P until the printing position of the print head 21 is upstream of the label paper P in the conveying direction from the preprinted image PP by a prescribed distance. Here, before the process of S15b is executed, the preprinted image PP on the label paper P is conveyed to the CIS unit 22, and thus there is a large blank on the label paper P from the preprinted image PP and the position of the print head 21. In S15b the label paper P is conveyed in the backward direction so that the blank on the label paper P from the preprinted image PP and the position of the print head 21 becomes small. Subsequently, the CPU 31 sets the conveying speed of the label paper P to 700 mm/s and controls the motor M to convey the label paper P in the conveying direction at the conveying speed of 700 mm/s. In S16 the CPU 31 controls the print head 21 to execute a sample print of the target image. In the sample print, the CPU 31 varies the droplet size of ink ejected from the print head 21 among five levels and controls the print head 21 to print the target image at each droplet size. As shown in a lower left part of FIG. 5, a sample print image SP is printed on the label paper P through the sample print of S16. Here, the sample print image SP includes five target images (five barcode symbols) corresponding to five droplet sizes of ink. That is, the five levels of droplet sizes are minimum, small, medium, large, and extra-large. The CPU 31 also controls the print head 21 to print the droplet sizes next to the corresponding target images.

After completing the sample print, in S17 the CPU 31 executes a defect detection ranking process with no changes in the conveying speed of the label paper P. The defect detection ranking process is performed to determine the quality rank (grade) of the barcode symbol included in each sample-printed target image. The defect detection ranking process will be described later.

After executing the defect detection ranking process, in S18a the CPU 31 controls the motor M to rewind the label paper P a prescribed distance so that an upstream part of the sample print image SP is positioned at the position of the print head 21. That is, the prescribed distance is based on a distance of the sample print image SP in the conveying direction in which five barcode symbols are arranged in the conveying direction. In S18b the CPU 31 controls the print head 21 to print the rank for the barcode symbol of each target image determined in the defect detection ranking process alongside the target image printed at each droplet size. In the example shown in FIG. 5, the rank is printed on the right of each target image.

In S19 of FIG. 4B, the CPU 31 determines whether the rank of the target image printed at each droplet size is greater than or equal to a prescribed rank based on the determination results found in the defect detection ranking process. Here, the prescribed rank may be a user-specified rank stored in the ROM 32 in association with the user information.

In a case that the rank for the target image printed at each droplet size is greater than or equal to the prescribed rank (S19: YES), the CPU 31 displays a screen on the operating panel 35 prompting the user to specify which of the five levels of droplet sizes (minimum, small, medium, large, and extra-large sizes) to use in a regular print (an actual print) of the target image.

In S20 the CPU 31 determines whether a droplet size is selected by the user through the operating panel 35. The CPU 31 repeats the determination in S20 while a droplet size is not been selected (S20: NO). In a case that the user has selected a droplet size through an operation on the operating panel 35 (S20: YES), in S21 the CPU 31 sets the droplet size in the print settings to the selected droplet size and the conveying speed in the print settings to the speed used for the label paper P in the last sample print. In S22 the CPU 31 records the user-specified droplet size and the conveying speed of the label paper P in the last sample print in the ROM 32 in association with the user information. The process of S21 and S22 is an example of a print condition setting process. Note that the print settings such as the droplet size and the conveying speed recorded in S22 is to be used for a printing process such as a preprint (S22) executed in a next printing process.

Thereafter, in S23 the CPU 31 controls the print head 21 and the motor M to print the target image on the label paper P according to the print settings recorded in S22.

However, in a case that the rank for the target image printed at any one droplet size is not greater than or equal to the prescribed rank (S19: NO), in S24 the CPU 31 determines whether the sample print of the target images was performed while conveying the label paper P at the conveying speed of 100 mm/s. In a case that the sample print was not performed at the 100 mm/s conveying speed (S24: NO), in S25 the CPU 31 determines whether the sample print of the target images was performed at a conveying speed of 400 mm/s.

In a case that the sample print was not performed at a conveying speed of 400 mm/s (S25: NO), in S26 the CPU 31 sets the conveying speed for the label paper P to 400 mm/s and controls the print head 21 to execute a sample print of the target images. In S27 the CPU 31 stores information in the RAM 33 indicating that the sample print was executed at a conveying speed of 400 mm/s. After completing the sample print of S26, the CPU 31 returns to S17 of FIG. 4A and executes the defect detection ranking process without modifying the conveying speed. The subsequent process is identical to that described above.

In a case that the rank determined for the target image printed at any one droplet size is still lower than the prescribed rank after reducing the conveying speed of the label paper P to 400 mm/s (S19: NO, S24: YES, S25: YES), in S28 the CPU 31 sets the conveying speed of the label paper P to 100 mm/s and controls the print head 21 to execute a sample print of the target images. In the example shown in FIG. 5, the sample print image SP printed in S28 (at 100 mm/s) is located on the right of the sample print image SP printed in S16 (at 700 mm/s). Thus, before printing the target images in the process of S28, the CPU 31 controls the motor M to rewind the label paper P so that the top of the sample print image SP printed in S16 (at 700 mm/s) is located at the print head 21. Alternatively, in S28 the sample print image SP may be printed below the sample print image SP printed in S26 (at 400 mm/s) without conveying the label paper P in the backward direction. Or, in S26 the sample print image SP (printed at 400 mm/s) may be printed on the right of the sample print image SP printed in S16 (at 100 mm/s) and in S28 the sample print image SP may be printed below the sample print image SP printed in S16. In S29 the CPU 31 stores in the RAM 33 information indicating that the sample print was executed at a conveying speed of 100 mm/s. After completing the sample print of S28, in S17 of FIG. 4A the CPU 31 executes the defect detection ranking process without modifying the conveying speed. The subsequent process is identical to that described above. The process in S16 and S24-S29 is an example of a sample printing process.

In a case that the rank determined for the target image printed at any one droplet size is still lower than the prescribed rank after reducing the conveying speed of the label paper P to 100 mm/s (S19: NO, S24: YES), in S20 the CPU 31 displays a screen on the operating panel 35 prompting the user to select which of the five levels of droplet sizes to use in a normal print of the target image. Further, in S20 the CPU 31 determines whether a droplet size is selected by the user through the operating panel 35. In a case that no droplet size is selected (S20: NO), the CPU 31 executes the determination repeatedly, and thus waits until the user selects a droplet size.

Defect Detection Ranking Process

Figure 6A:
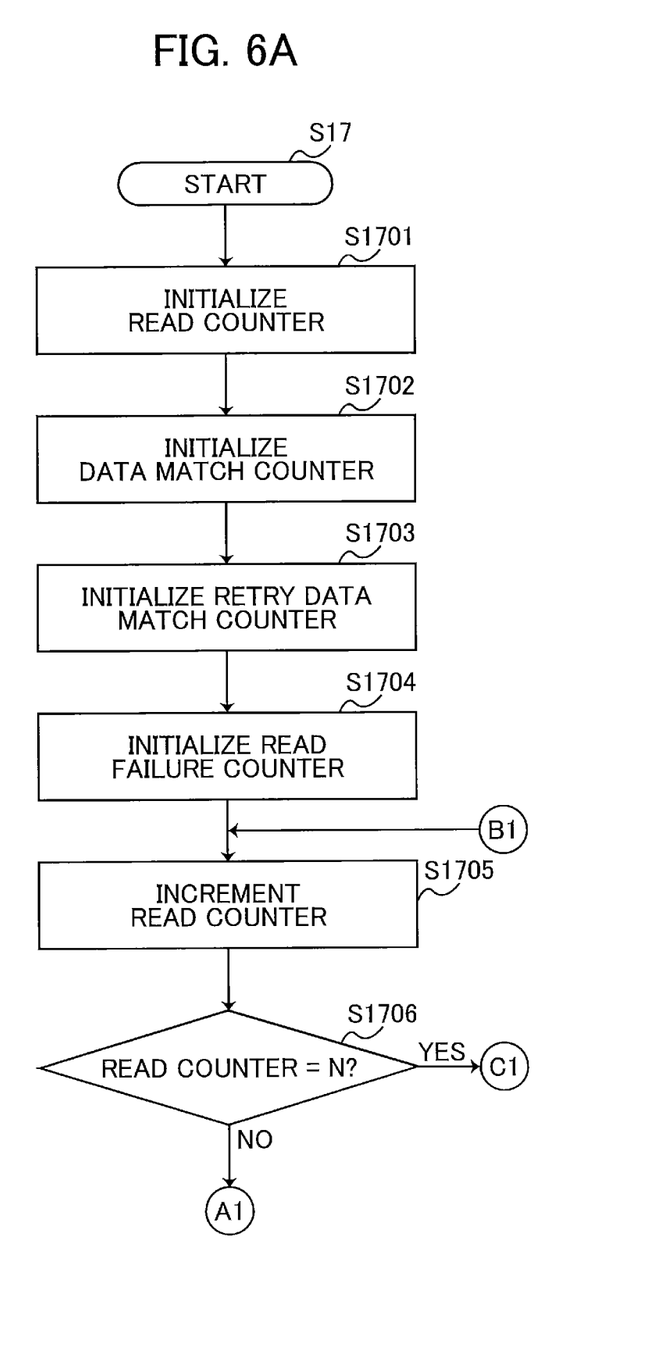
FIG. 6A is a flowchart illustrating a first part of a defect detection ranking process.
Figure 6B:
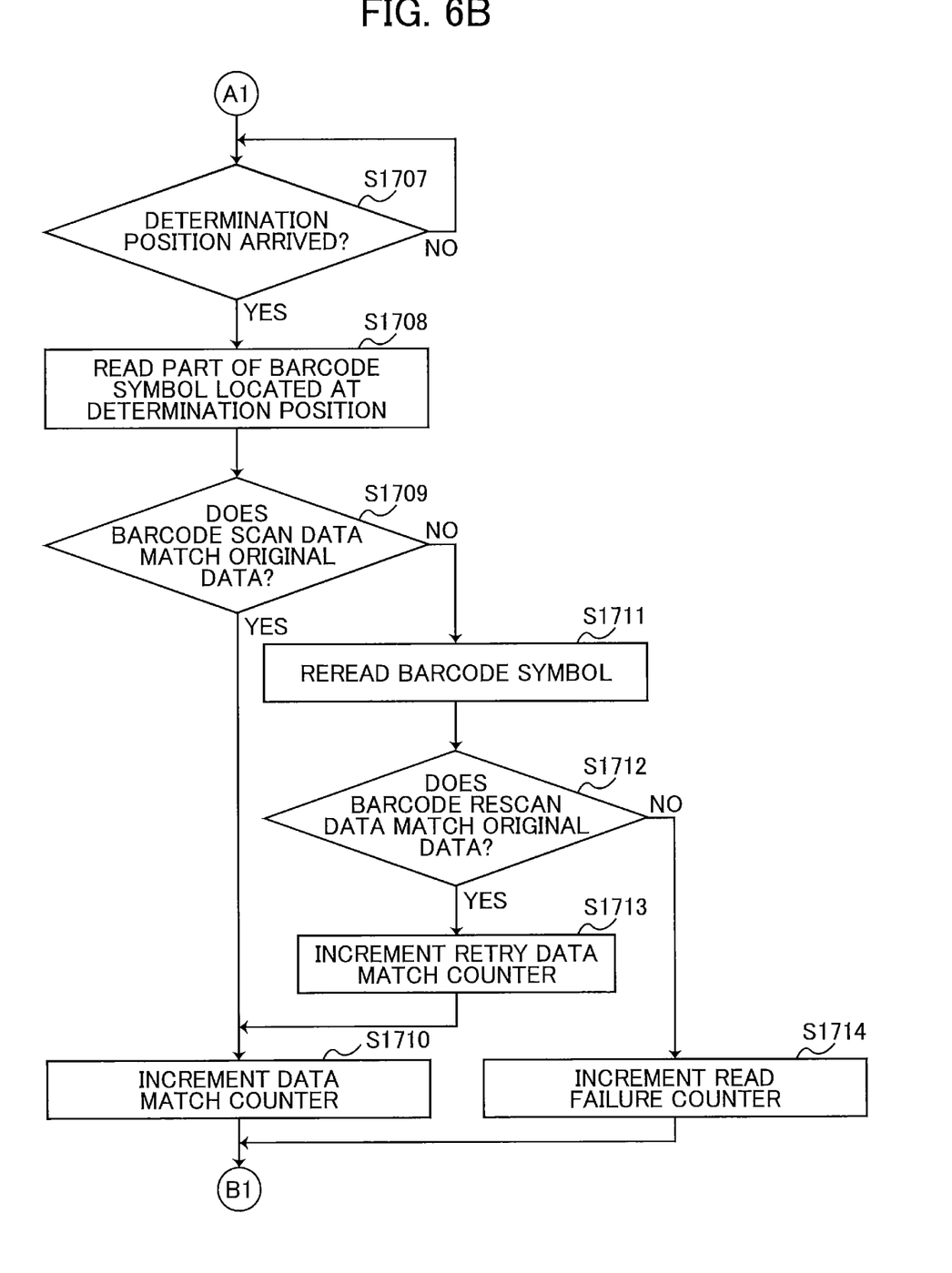
FIG. 6B is a flowchart illustrating a second part of the defect detection ranking process.
Figure 6C:
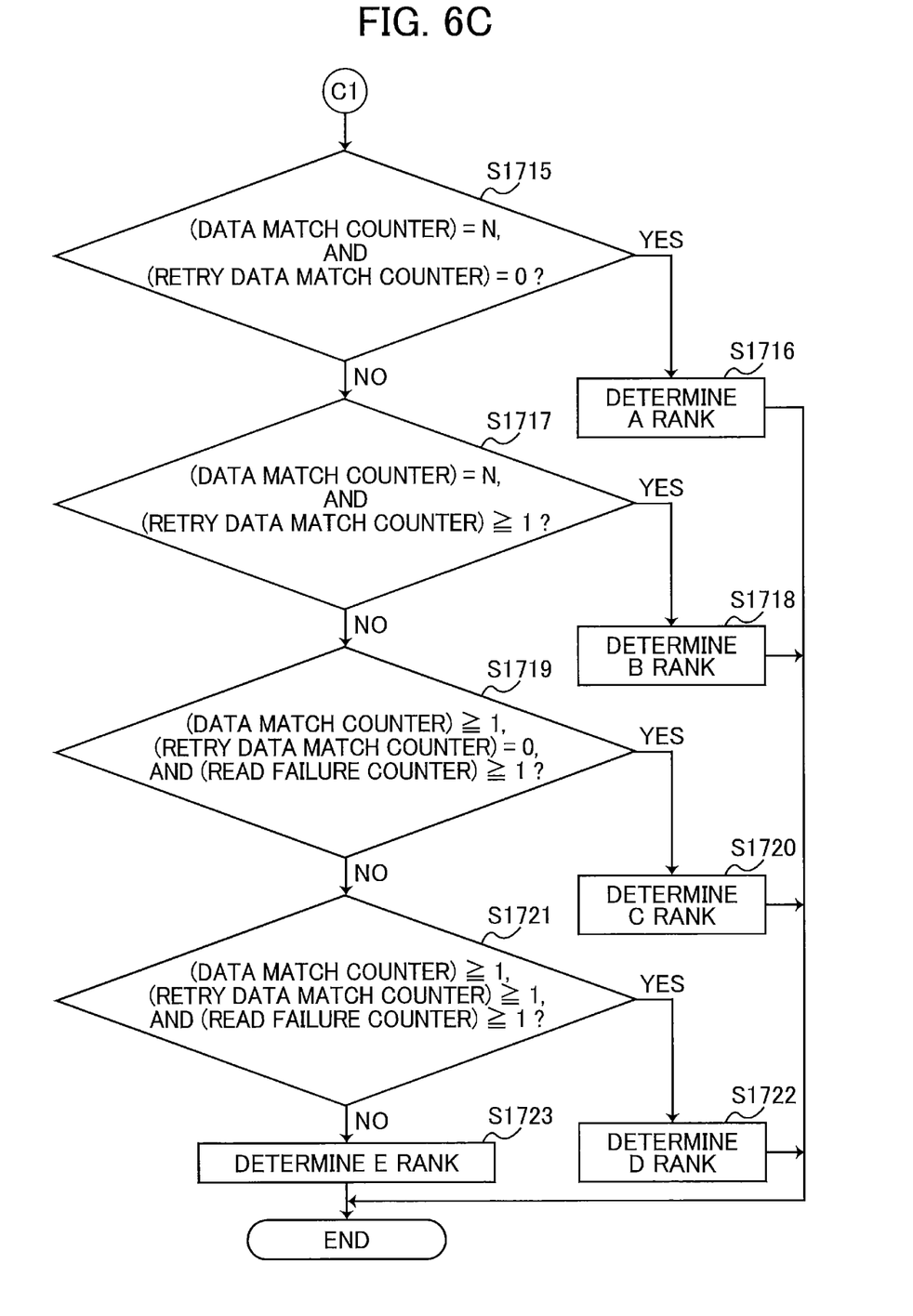
FIG. 6C is a flowchart illustrating a third part of the defect detection ranking process.

FIGS. 6A, 6B, and 6C illustrate steps in the defect detection ranking process executed in S17 of FIG. 4B. The defect detection ranking process is an example of a quality determination process.

In S1701, S1702, S1703, and S1704 of the defect detection ranking process, the CPU 31 initializes individual counters, and specifically resets the counters to 0. That is, in S1701 the CPU 31 initializes a read counter that counts the number of times a barcode symbol (the target image) is read. In S1702 the CPU 31 initializes a data match counter that counts the number of times a scanned barcode symbol matches the original data. In S1703 the CPU 31 initializes a retry data match counter that counts the number of times a rescanned barcode symbol matches the original data. In S1704 the CPU 31 initializes a read failure counter that counts the number of times reading of a barcode symbol failed in a rescan.

In S1705 the CPU 31 increments the value of the read counter. In S1706 the CPU 31 determines whether the value of the incremented read counter has reached a prescribed number N. The prescribed number N is set to an integer of 2 or greater, such as 4.

A plurality of determination positions is defined or set for each barcode symbol (each sample-printed target image). In a case that the value of the read counter has not reached the prescribed number N (S1706: NO), in S1707 of FIG. 6B the CPU 31 determines whether a determination position of the target barcode symbol is arrived at the reading position of the CIS unit 22. The CPU 31 repeats the determination in S1707 while the determination position is not arrived at the reading position of the CIS unit 22 (S1707: NO). As the label paper P is conveyed, the determination position of the barcode symbol is arrived at the reading position of the CIS unit 22, i.e., a specific position in the symbol in the direction in which the bars of the symbol extend (the conveying direction in the embodiment) is arrived at the reading position (S1707: YES). In a case that the determination position is at the reading position of the CIS unit 22, in S1708 the CPU 31 controls the CIS unit 22 to read (or scan) a part of the barcode symbol located at the determination position. The process of S1708 is an example of the first reading process. As will be described later, determination positions of a number equivalent to the prescribed number N are set for each sample-printed barcode symbol. Specifically, determination positions are set at N points in the conveying direction in which the bars of the barcode symbol extend.

In S1709 the CPU 31 determines whether the data of the barcode symbol read by the CIS unit 22 (hereinafter called the "barcode scan data") matches the data (hereinafter called the "original data") of the barcode symbol included in the print data.

In a case that the barcode scan data matches the original data (S1709: YES), in S1710 the CPU 31 increments the value of the data match counter. Subsequently, the CPU 31 returns to S1705 of FIG. 6A and increments the value of the read counter and in S1706 determines whether the value of the incremented read counter has reached the prescribed number N.

In a case that the value of the read counter has not yet reached the prescribed number N (S1706: NO), in S1707 the CPU 31 determines whether the next determination position of the target barcode symbol is at the reading position of the CIS unit 22. As the label paper P is conveyed, the next determination position is arrived at the reading position of the CIS unit 22 (S1707: YES). In a case that the next determination position is at the reading position of the CIS unit 22, in S1708 the CPU 31 controls the CIS unit 22 to read a part of the barcode symbol located at the determination position and in S1709 determines whether the barcode scan data matches the original data.

In a case that the barcode scan data does not match the original data (S1709: NO), in S1711 the CPU 31 controls the CIS unit 22 to reread (rescan) the barcode symbol before the determination position has shifted much from the reading position of the CIS unit 22. In S1712 the CPU 31 again determines whether data extracted from the barcode symbol reread by the CIS unit 22 (hereinafter called the "barcode rescan data") matches the original data. In a case that the barcode rescan data matches the original data (S1712: YES), in S1713 the CPU 31 increments the value of the retry data match counter and in S1710 increments the value of the data match counter. Subsequently, in S1705 the CPU 31 increments the value of the read counter and in S1706 determines whether the value of the incremented read counter has reached the prescribed number N. The process of S1711 is an example of a rereading process.

On the other hand, in a case that the CPU 31 determines in S1712 that the barcode rescan data does not match the original data (S1712: NO), in S1714 the CPU 31 increments the read failure counter. Thereafter, in S1705 the CPU 31 increments the value of the read counter and in S1706 determines whether the value of the incremented read counter has reached the prescribed number N. The processes of S1707 and S1709 are an example of a matching state determination process, the process of S1707 is an example of a first determination process, and the process of S1709 is an example of a second determination process.

In a case that the CPU 31 determines in S1706 that the value of the read counter has reached the prescribed number N (S1706: YES), in S1715 of FIG. 6C the CPU 31 determines whether a determination condition A is met. The determination condition A requires that the value of the data match counter be equivalent to the prescribed number N and the value of the retry data match counter be 0. In a case that the determination condition A is met (S1715: YES), in S1716 the CPU 31 determines that the target barcode is of A rank quality.

However, in a case that the determination condition A is not met (S1715: NO), in S1717 the CPU 31 determines whether the determination condition B has been met. The determination condition B requires that the value of the data match counter be the prescribed number N and the value of the retry data match counter be 1 or greater. In a case that the determination condition B is met (S1717: YES), in S1718 the CPU 31 determines that the target barcode is of B rank quality.

However, in a case that the determination condition B is not met (S1717: NO), in S1719 the CPU 31 determines whether a determination condition C is met. The determination condition C requires that the value of the data match counter be 1 or greater, and the value of the retry data match counter be 0, and that the value of the read failure counter be 1 or greater. In a case that the determination condition C is met (S1719: YES), in S1720 the CPU 31 determines that the target barcode is of C rank quality.

However, in a case that the determination condition C is not met (S1719: NO), in S1721 the CPU 31 determines whether a determination condition D is met. The determination condition D requires that the value of the data match counter be 1 or greater, the value of the retry data match counter be 1 or greater, and the value of the read failure counter be 1 or greater. In a case that the determination condition D is met (S1721: YES), in S1722 the CPU 31 determines that the target barcode is of D rank quality.

However, in a case that determination condition D is not met (S1721: NO), in S1723 the CPU 31 determines that the target barcode is of E rank quality. The defect detection ranking process described above is executed for each of the target images printed according to 5 droplet sizes.

Effects

As described above, samples of a barcode in the print data are printed on the label paper P while varying printing conditions, such as ink droplet size and conveying speed of the label paper P. Thereafter, the CPU 31 controls the CIS unit 22 to read the plurality of sample barcodes printed on the label paper P, determines the quality of each barcode, and sets printing conditions for the print data based on these determination results.

In this way, the CPU 31 can set printing conditions for printing barcodes and can reduce the user's time and effort required to set such printing conditions.

The determination results on the quality of the barcodes are also printed in association with the sample-printed barcodes and their printing conditions. In this way, the user can easily recognize the printing conditions of the sample-printed barcodes.

The printing conditions for the sample print, which are the ink droplet size and the conveying speed of the label paper P, are added to the print settings for the print data (target image). Accordingly, the CPU 31 can print the print data according to the printing conditions used for the sample print and, hence, can print actual print data with the same quality as the sample print.

In the sample print, a plurality of target images is printed with different ink droplet sizes. Hence, the user can compare the plurality of target images in the sample print and can identify the different levels of quality when printing with different droplet sizes. Thus, the user can easily establish print settings capable of producing images of a user-desired quality.

Modifications

While the disclosure has been described in detail with reference to the specific embodiment thereof, modifications described below may be made.

For example, since the CIS unit 22 reads a preprinted image PP in the printing process, the CPU 31 may compare data generated by the CIS unit 22 (barcode scan data) when reading the preprinted image PP with data generated by the CIS unit 22 when reading the sample-printed target images and may determine the quality of barcodes based on the degree of agreement among the data, instead of performing the defect detection ranking process described in the embodiment.

Figure 7:
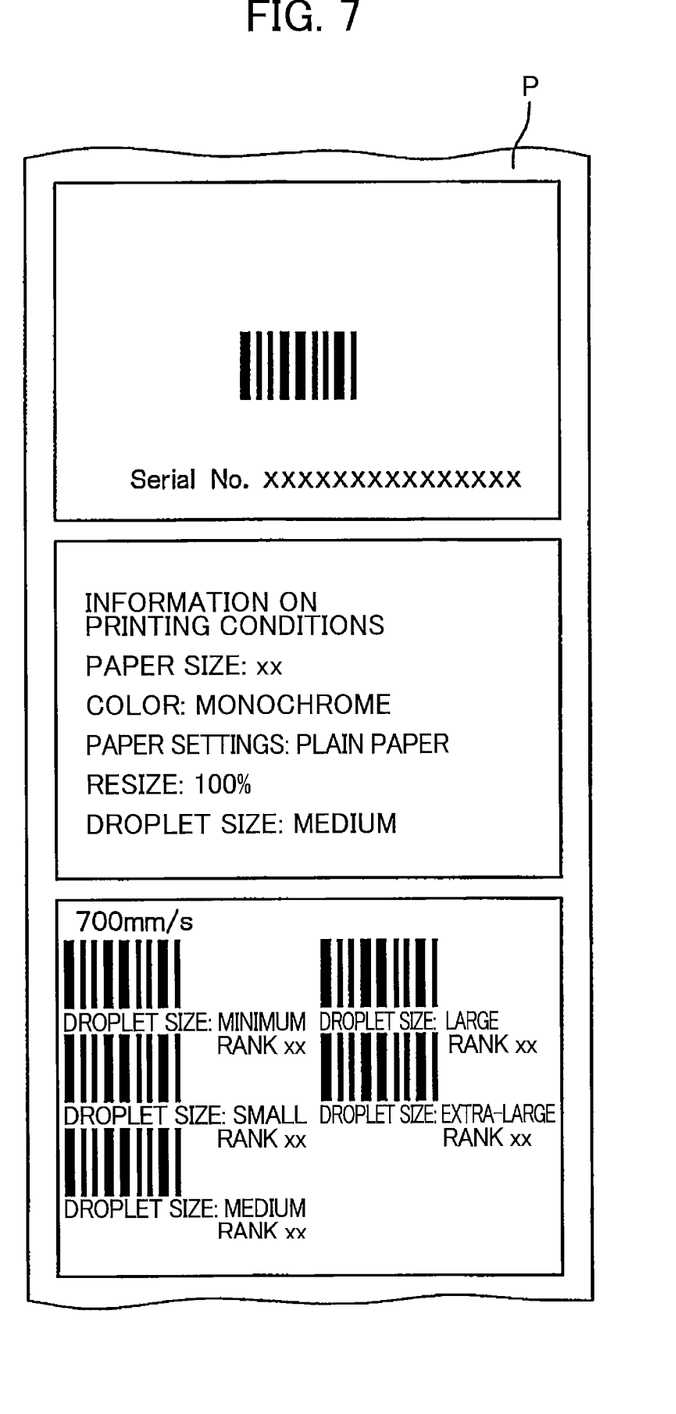
FIG. 7 is an explanatory diagram illustrating examples of a preprinted image and sample print images printed on a die-cut paper.

Further, while the target image is preprinted and sample-printed on a non-fixed-length (continuous) label paper P in the example of FIG. 5, the target image may be preprinted and sample-printed on a die-cut paper, as illustrated in FIG. 7. In this case, the target image may be printed on separate labels for the preprint and sample print. Additionally, in a preprint the target image and the character strings representing content of the print settings may be printed on separate labels.

In the embodiment described above, the CPU 31 executes a sample print by printing the target image while varying the ink droplet size among a plurality of levels. However, the droplet size used in the sample print may be maintained at the size indicated in the print settings while varying the resolution, varying the density by skipping ejection nozzles, or varying other conditions. Further, the printing system used in the printing portion is not limited to an inkjet system but may be a laser system or a thermal system. In such cases, sample printing may be performed while suitably varying printing conditions of the corresponding printing system.

The reading unit is not limited to the CIS unit 22, but may be any device configured to read images, such as charge-coupled devices (CCDs).

When executing a sample print in the embodiment described above, the conveying speed of the label paper P is initially set to the maximum conveying speed of the device. However, the CPU 31 may set the conveying speed for the sample print in accordance with conveying speed information included in the print settings set in advance.

In the embodiment, the user selects a droplet size through an operation on the operating panel 35 based on determination results produced in the defect detection ranking process, and the CPU 31 sets the selected droplet size as the size to be used in a regular print (actual print) of the target image. However, the CPU 31 may be configured to set the printing condition for a normal print of a target image to the printing condition having the highest rank produced in the defect detection ranking process, without waiting for input from the user. Alternatively, the CPU 31 may be configured to set the printing condition to the printing condition having a highest conveying speed among printing conditions having ranks higher than or equal to a predetermined rank.

In the embodiment, ranks determined in the defect detection ranking process are printed on the label paper. However, rather than printing the ranks, the ranks may be displayed together with printing conditions on the display of the label printer 1, and the user may be prompted to select the desired printing condition.

In the embodiment, YES determination is made in S19 in a case that the ranks for all the droplet sizes are greater than or equal to the prescribed rank, and NO determination is made in S19 in a case that one rank for one droplet size is smaller than the prescribed rank. However, the determination in S19 may not limited thereto. For example, YES determination is made in S19 in a case that a rank for one droplet sizes is greater than or equal to the prescribed rank, and NO determination is made in S19 in a case that the ranks for all the droplet sizes are smaller than the prescribed rank.

While the disclosure has been described in detail with reference to the specific embodiment thereof, it would be apparent to those skilled in the art that various changes and modifications may be made therein without departing from the scope of the invention.

What is claimed is:

1. A printer comprising:
   a receiving portion configured to receive barcode data representing a barcode;
   a printing portion configured to print an image on a sheet;
   a reading portion configured to read the image printed on the sheet; and
   a controller configured to perform:
      a sample print process to control the printing portion to execute a sample print to print on a sheet a plurality of barcodes, each of the plurality of barcodes being represented by the received barcode data and printed in a different printing condition;
      a first reading process to control the reading portion to read the plurality of barcodes printed on the sheet in the sample print process to obtain a plurality of sets of scan data corresponding to respective ones of the plurality of barcodes;
      a quality determination process to determine qualities of the plurality of printed barcodes based on the respective ones of the plurality of sets of scan data; and
      a printing condition setting process to set a printing condition based on the qualities determined in the quality determination process, the set printing condition being to be used to print a barcode by the printing portion.

2. The printer according to claim 1, further comprising a conveyance portion configured to convey the sheet in selective one of a forward direction and a backward direction opposite the forward direction,
   wherein the printing portion is configured to print the image on the sheet while the conveyance portion conveys the sheet in the forward direction,
   wherein the reading portion is located downstream of the printing portion in the forward direction,
   wherein the reading portion is configured to read the image on the sheet while the conveyance portion conveys the sheet in the forward direction,
   wherein after the first reading process, the controller is configured to execute:
      controlling the conveyance portion to convey the sheet in the backward direction;
      switching the conveyance portion to convey the sheet in the forward direction from the backward direction after the conveyance portion conveys the sheet in the backward direction; and
      a determination result printing process to print a result of the quality determination process on the sheet while controlling the conveyance portion to convey the sheet in the forward direction.

3. The printer according to claim 2, where the plurality of barcodes is printed on the sheet to be arranged in the forward direction,
   wherein a distance in which the sheet is conveyed in the backward direction is based on a distance in which the plurality of barcodes is arranged in the forward direction.

4. The printer according to claim 1, wherein the controller is configured to further perform a notification process to notify that the plurality of sample printing conditions used in the sample print process.

5. The printer according to claim 1, further comprising an input interface configured to receive inputted information designating one of the plurality of barcodes printed on the sheet in the sample print process, wherein in the printing condition setting process the controller sets the printing condition to include a sample printing condition used for printing the barcode, which is designated by the inputted information, in the sample print process.

6. The printer according to claim 1, further comprising a conveyance portion configured to convey the sheet in selective one of a forward direction and a backward direction opposite the forward direction, wherein the printing portion is configured to print the image on the sheet while the conveyance portion conveys the sheet at a first conveyance speed in the forward direction, wherein the reading portion is located downstream of the printing portion in the forward direction, wherein the reading portion is configured to read the image on the sheet while the conveyance portion conveys the sheet in the forward direction, wherein in a case that one of the qualities determined in the quality determination process is lower than a prescribed quality, the controller does not perform the printing condition setting process, but performs again both the sample print process and the first reading process while the controlling the conveyance portion to convey the sheet at a second conveyance speed slower than the first conveyance speed, and thereafter performs again the quality determination process and the printing condition setting process based on a plurality of sets of scan data obtained in the first reading process performed again.

7. The printer according to claim 6, wherein in a case that each of qualities determined in the quality determination performed again is greater than the prescribed quality, the controller sets, as a conveyance speed in the printing condition, the second conveyance speed.

8. The printer according to claim 1, wherein the quality determination process includes a matching degree determination process to evaluate degree of agreement between the barcode data received by the receiving portion and each of the plurality of sets of scan data.

9. The printer according to claim 8, wherein the first reading process is performed at each of a plurality of specific positions defined on the sheet and the matching degree determination process is performed for each set of scan data obtained for each of the plurality of specific positions, wherein the controller determines a quality to be increased as the number of times the set of scan data matches the barcode data increases.

10. The printer according to claim 9, further comprising a conveyance portion configured to convey the sheet in selective one of a forward direction and a backward direction opposite the forward direction, wherein the printing portion is configured to print the image on the sheet while the conveyance portion conveys the sheet in the forward direction, wherein the reading portion is located downstream of the printing portion in the forward direction, wherein the reading portion is configured to read the image on the sheet while the conveyance portion conveys the sheet in the forward direction, wherein the matching degree determination process includes a first determination process to determine whether a set of scan data read at each of the plurality of specific positions matches the barcode data received by the receiving portion, wherein in a case that the set of scan data at one of the plurality of specific positions does not match the barcode data, the controller is configured to perform:

a rereading process to reread the barcode at the one of the plurality of specific positions to obtain a set of scan data; and a second determination process to determine whether the set of scan data obtained in the rereading process matches the barcode data received by the receiving portion, wherein in the quality determination process the controller determines a quality of the barcode based on a result of the first determination process and a result of the second determination process.

11. The printer according to claim 10, wherein the quality determination process determines a first quality for the barcode in a case that the first determination determines that the set of scan data of the barcode matches the barcode data and wherein the quality determination process determines a second quality for the barcode lower than the first quality in a case that the first determination process determines that the set of scan data of the barcode does not match the barcode data but the second determination process determines that the set of scan data of the barcode matches the barcode data.

12. The printer according to claim 1, wherein the controller is configured to further perform:

a preprint process to control the printing portion to preprint a barcode on a sheet based on the received barcode data; and a second reading process to control the reading portion to read the preprinted barcode, wherein in the quality determination process determines a quality of a barcode based on determination as to whether the set of scan data of the barcode obtained in the first reading process matches a set of scan data of the barcode obtained in the second reading process.

13. The printer according to claim 1, further comprising a conveyance portion configured to convey the sheet in selective one of a forward direction and a backward direction opposite the forward direction, wherein the printing portion is configured to print the image on the sheet while the conveyance portion conveys the sheet in the forward direction, wherein the reading portion is located downstream of the printing portion in the forward direction, wherein the reading portion is configured to read the image on the sheet while the conveyance portion conveys the sheet in the forward direction, wherein the controller is configured to further perform:

a preprint process to control the printing portion to preprint a barcode on a sheet based on the received barcode data; and a sheet determination process to control the reading portion to read the preprinted barcode to generate a preprint reading result, and determine based on the preprint reading result whether the sheet for the barcode is used, wherein in a case that the sheet determination process determines that the sheet for the barcode is used, the controller is configured to perform:

controlling the conveyance portion to convey the sheet in the backward direction after the first reading process; and switching the conveyance portion to convey the sheet in the forward direction from the backward direction after the conveyance portion conveys the sheet in the backward direction, wherein the sample print process is performed after switching the conveyance portion to convey the sheet in the forward direction.

14. The printer according to claim 13, wherein in the preprint process, the barcode is preprinted in a printing condition set in a printing condition setting process which is executed prior to the preprint process.

15. The printer according to claim 1, wherein in the sample print process, the plurality of barcodes is printed while varying a resolution.

16. The printer according to claim 1, wherein the sheet is a die-cut paper including a continuous base paper extending in a longitudinal direction and labels affixed to the continuous base paper in a juxtaposition in the longitudinal direction, wherein in the sample print process, a prescribed number of barcodes is printed on one label.

17. A printer comprising:
a receiving portion configured to receive barcode data representing a barcode;
a printing portion configured to print an image on a sheet;
a reading portion configured to read the image printed on the sheet; and
a controller configured to perform:
a sample print process to control the printing portion to execute a sample print to print on a sheet a plurality of barcodes, each of the plurality of barcodes being represented by the received barcode data and printed in a different printing condition;
a first reading process to control the reading portion to read the plurality of barcodes printed on the sheet in the sample print process to obtain a plurality of sets of scan data corresponding to respective ones of the plurality of barcodes;
a quality determination process to determine qualities of the plurality of printed barcodes based on the respective ones of the plurality of sets of scan data; and
a notification process to notify the qualities determined in the quality determination process.

\* \* \* \* \*